United States Patent Office 3,273,025
Patented Sept. 13, 1966

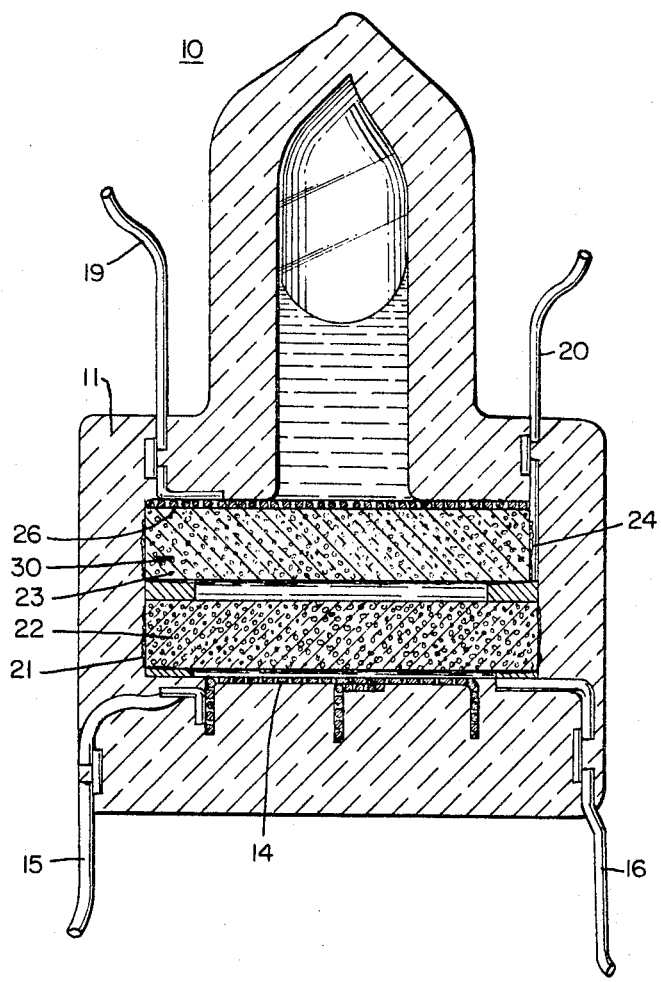

3,273,025
SOLION CELL WITH ELECTRODES ENGAGING CONTAINER WALL FOR PREVENTING ION-DRIFT
Harry R. Broadley, Reading, Mass., assignor to General Electric Company, a corporation of New York
Filed Apr. 1, 1963, Ser. No. 269,662
8 Claims. (Cl. 317—230)

This invention relates to electrochemical devices, and more particularly, to an improved solion having reduced error-producing drift in readout current.

A solion is an electrochemical cell utilizing an electrolytic solution which enters into a reversible electrochemical reaction at its electrodes under preselected operating conditions. One of the characteristics of such devices which makes them useful is their ability to reliably integrate applied electrical signals. This ability is dependent upon the maintenance or storage of any given concentration of ions within the integral compartment for a long period of time without change when no input signal is being applied to the device. This means that the concentration of ions formed in the integral compartment at the common electrode, which is proportional to the charge applied to the device, must not increase or decrease due to the drift of ions into or out of the integral compartment since this would lead to erroneous readout indications.

This application discloses a solion device which is an improvement upon the type of solion device described in the prior copending application of Clarence W. Hewlett, Jr., Ser. No. 269,037, filed March 29, 1963, and assigned to the same assignee as the present invention.

Devices of the type disclosed and claimed in the Hewlett application are characterized by the type of construction in which the reservoir and integral compartments are separated from the barrier space by elements that are in intimate contact with the inner walls of the container, but are not sealed to the container walls. Thus, not being sealed, there are minute paths which permit leakage or drift of solution around these elements.

The glass frit elements utilized in the device of the Hewlett application can not be conveniently sealed to the container walls to eliminate this leakage since the temperatures required to do so would cause the frits to melt thus destroying their porosity. In other solion devices utilizing this type of construction, it may not be convenient or economical to seal the minute channels which by-pass the shield and readout electrodes because of problems generated by utilizing different materials with different coefficients of expansion. Thus, even though extreme care has been taken to assure an intimate contact to prevent such leakage, such as by heating the device under vacuum so as to draw the container into contact with the internal elements, as disclosed in the Hewlett application, it is not feasible to completely stop the flow of the solution through these channels.

As was indicated in the Hewlett application, the drift rate of a solion effectively controls the length of time that an integral can be stored in the integral compartment with any degree of accuracy. The drift problem therefore strikes at the very characteristic which renders solions so useful since integration, of necessity, requires accurate long term storage. This drift phenomena of the readout current is due to the movement of, what has been termed, the measured species across the barrier space in either direction; i.e., the measured species may be either drifting out of the integral compartment thus giving rise to a negative drift in readout current, or measured species may be drifting across the barrier space to contact the readout electrode thus giving rise to a positive drift. It thus appears to be desirable to provide a solion device which is based upon the recognition of the fact that it may not be feasible in this type of solion to economically seal the internal elements to the container. It would thus appear to be desirable to concentrate upon preventing the escape of the measured species of the ion from the compartments.

It is therefore an object of the invention to provide a solion with improved drift characteristics by arranging the electrodes in a particular configuration which prevents the leakage of the measured species into the barrier space, thus rendering the device more accurate.

It is another object of the invention to form the reservoir compartment of a solion through the cooperation of a planar input electrode and a cup-shaped shield electrode, the side of which is in intimate contact with the inner walls of the container.

It is yet a further object of this invention to provide a reservoir compartment which is substantially encompassed by the input and shield electrodes.

It is another object of the invention to provide a cup-shaped readout electrode, the side of which is in intimate contact with the inner walls of the container.

Briefly described, this invention contemplates improving these types of devices by extending the shield electrode up the sides of the element, which is interposed between it and the input electrode, so as to form a reservoir compartment which is substantially encompassed by electrodes. This results in lining the leakage path with the shield electrode if the side of the shield electrode is in intimate contact with the container wall. The invention also contemplates shaping the readout electrode to prevent the escape of the measured species from the integral compartment. In accordance with the invention, the shield and readout electrodes are shaped and positioned with respect to the container wall so as to improve the chances that any measured species of the ion by-passing these electrodes will be reduced by the negatively biased electrodes to their unmeasured species before they reach the barrier space. It can thus be seen that, in a potassium iodide-iodine redox system which is in common use, any escaping iodine ions will be converted to iodide ions. Consequently, iodine is prevented from entering the iodine-free barrier space.

Referring now to the drawing, there is shown a solion device 10, the component parts of which will bear reference numerals which are the same as the corresponding elements of the prior copending Hewlett application.

Solion 10 is comprised of a container 11 which is divided by its electrodes into a reservoir compartment, an integral compartment and a barrier space. Input electrode 26 and shield electrode 24 define the reservoir compartment, while readout electrode 21 and common electrode 14 define the integral compartment. The barrier space is the remaining space which is interposed between the integral compartment and the reservoir compartment and thus is defined between shield electrode 24 and readout electrode 21. Connections to common electrode 14, readout electrode 21, shield electrode 24 and input electrode 26 are provided by leads 15, 16, 20 and 19, respectively.

Reference may be had to the prior copending Hewlett application for a more complete description of the manner of constructing, and the materials which may be used in constructing, the preferred embodiment of the invention. The construction and materials utilized in producing the preferred embodiment are the same as those utilized in producing the preferred embodiment of the Hewlett application, except that in forming the shield and readout electrodes improved drift characteristics may be obtained by not only sputtering the platinum on the bottom of glass frits 22 and 23 but also by supttering platinum up the sides of these glass frits so as to form cup-shaped electrodes.

The platinum which is sputtered on the peripheral region of glass frit disks 22 and 23 terminates short of the upper surface thereof so as to prevent the shorting of the read-out and shield electrodes to the shield and input electrodes, respectively. In the preefrred embodiment of my invention, the sputtering terminates about two-thirds of the way towards the upper surface of each disk. The platinum is sputtered on the frits to a thickness which will provide about 10 ohms of resistance across the diameters of the shield electrode and the readout electrode.

Even though this invention has been described with reference to the prior copending Hewlett application, it should be recognized that the invention is equally applicable to reduce drift in any solion device by inserting portions of the shield and readout electrodes between inner electrode-supporting elements and the wall of the container so as to reduce any ions of the measured species that might tend to leak around the shield and readout electrodes.

While there has been described what is at present considered to be a preferred embodiment of the invention, it will be apparent to those skilled in the art that various changes and modifications may be made therein without departing from the spirit and scope of the invention.

What I claim as new and desire to secure by Letters Patent of the United States is:

1. An electrical readout integrator comprising a container, a redox electrolytic solution in said container; a plurality of spaced electrodes coaxially arranged within said container comprising a common electrode, a read-out electrode, an input electrode and a shield electrode; porous insulating means interposed between and contacting said input and shield electrodes for spacing one with respect to the other, said insulating means having two opposed surfaces and an encompassing peripheral surface, said shield electrode being in continuous contact with one of said opposed surfaces and said peripheral surface, a portion of said shield electrode continuously engaging said peripheral surface along a portion of its axial length, the portion of said shield electrode in contact with said peripheral surface also being in contact with the interior surface of said container, said input and shield electrodes and said container defining a reservoir compartment, said electrodes being taken from the class consisting of platinum and its noble metal alloys.

2. The combination of claim 1 in which said shield electrode is formed by sputtering a metal selected from said class upon said one opposed surface and said peripheral surface.

3. The combination of claim 2 in which said shield electrode terminates on said peripheral surface short of the other of said opposed surfaces, said input electrode being in contact with said other surface so that said shield electrode is insulated from the input electrode.

4. An electrical readout integrator comprising a container, a redox electrolytic solution in said container; a plurality of spaced electrodes coaxially arranged within said container comprising a common electrode, a read-out electrode, an input electrode and a shield electrode, porous insulating means interposed between and contacting said input and shield electrodes for spacing and insulating one with respect to the other; said shield electrode being cup-shaped with the side thereof in contact with the interior surface of said container and a portion of the peripheral surface of said insulating means, said positioning means insulating said shield electrode so that the open top thereof is in close proximity to said input electrode to define a reservoir compartment, said electrodes being taken from the class consisting of platinum and its noble metal alloys.

5. The combination of claim 4 in which said insulating means comprises a porous glass frit disk which supports said shield electrode on one of its opposed faces as well as on a substantial portion of its peripheral surface.

6. The combination of claim 4 further comprising second porous insulating means interposed between said shield and readout electrodes for positioning one with respect to the other, said readout electrode being cup-shaped with the side thereof in contact with the interior surface of said container, said second insulating means positioning said readout electrode so that the open top thereof is in close proximity to said shield electrode to define a barrier space which is substantially encompassed on all sides by said shield and readout electrodes.

7. The combination of claim 6 in which said first and second insulating means comprises first and second glass frit disks having said shield and readout electrodes, respectively, in contact with an opposed surface, as well as substantially the entire peripheral region of each of said disks.

8. The combination of claim 7 in which said shield and readout electrodes comprise platinum which is sputtered on said first and second glass frits to provide electrodes which are tightly bonded to said glass frit disks.

No references cited.

JOHN W. HUCKERT, *Primary Examiner.*

J. D. KALLAM, *Assistant Examiner.*